US006531228B1

(12) United States Patent
Bartelink et al.

(10) Patent No.: US 6,531,228 B1
(45) Date of Patent: Mar. 11, 2003

(54) LIQUID URETHANE COMPOSITIONS FOR TEXTILE COATINGS

(75) Inventors: Camiel F. Bartelink, Terneuzen (NL); Henri J. M. Gruenbauer, Oostburg (NL); Hans Goetz, Ulm (DE); Martin Moeller, Ulm (DE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/509,442
(22) PCT Filed: Sep. 28, 1998
(86) PCT No.: PCT/US98/20231
§ 371 (c)(1),
(2), (4) Date: Jul. 10, 2000
(87) PCT Pub. No.: WO99/16800
PCT Pub. Date: Apr. 8, 1999

Related U.S. Application Data

(60) Provisional application No. 60/060,298, filed on Sep. 29, 1997.

(51) Int. Cl.[7] ............................ B32B 27/12; B32B 9/04; B05D 3/02; C08G 77/04; C08G 18/00
(52) U.S. Cl. ................. 428/423.1; 428/447; 427/393.4; 528/33; 528/44
(58) Field of Search ................. 428/447, 423.1; 427/393.4; 528/38, 44

(56) References Cited

U.S. PATENT DOCUMENTS

| | | | | |
|---|---|---|---|---|
| 4,540,765 A | | 9/1985 | Koemm et al. | 528/45 |
| 4,873,306 A | | 10/1989 | Wehowsky et al. | 528/28 |
| 4,902,767 A | * | 2/1990 | Roitman et al. | 528/28 |
| 5,258,458 A | | 11/1993 | Allewaert et al. | 525/104 |
| 5,276,175 A | | 1/1994 | Dams et al. | 560/27 |
| 5,910,557 A | * | 6/1999 | Audenaert et al. | 528/70 |
| 6,046,295 A | * | 4/2000 | Frisch et al. | 528/28 |

OTHER PUBLICATIONS

International Search Report dated Apr. 29, 1999 issued by the EPO acting as the International Searching Authority in PCT/US98/20231.

\* cited by examiner

Primary Examiner—Robert Dawson
Assistant Examiner—Michael J Feely

(57) ABSTRACT

Disclosed is a polyurethane based composition for treating textiles to provide such treated textile with oil, water or oil and water repellency. The composition comprises a polyfunctional liquid polyurethane-containing adduct wherein the adduct contains as a first functional group at least one structo-terminal blocked isocyanate moiety per molecule, and at least one second structo-terminal functional group per molecule which is a perfluoro or siloxane moiety.

9 Claims, No Drawings

LIQUID URETHANE COMPOSITIONS FOR TEXTILE COATINGS

This application claims the benefit of 60/060,298 filed Sep. 29, 1997.

The present invention relates to textile treatment compositions to impart oil and water repellency to textiles, methods of treating textiles and to the resulting treated textiles.

Various processes exist for the treatment of textiles to impart some water and/or oil repellency. For example, the use of various fluorochemical compositions for such purposes on fibers and fibrous substrates, is known. See, for example, Banks, Ed., *Organofluorine Chemicals and Their Industrial Applications*, Ellis Horwood Ltd., Chichester, England, 1979, pp. 226–234. As the fluorochemicals are generally expensive, extenders are generally added to reduce the cost. Considerable effort has been put forth in finding suitable extenders for use with fluorochemicals to impart water and oil repellency to fibers.

U.S. Pat. No. 5,466,770 describes a fluorochemical oil- and water-repelling agent together with a polymer extender and a polymer extender having a saturated carbon-carbon backbone chain and at least one percent by weight, based on the weight of the extender, of interpolymerized units derived from ethylenically-unsaturated monomer containing at least one blocked or masked isocyanato group.

U.S. Pat. No. 3,849,521 (Kirimoto et al.) describes water- and oil-repellent compositions containing an oil- and water-repellent fluoroalkyl-containing polymer and an additive copolymer containing monomer units having the formula $CR_1R_2=CR_3COOR_4$, wherein $R_1$, $R_2$ and $R_3$ represent hydrogen atoms or methyl groups, and $R_4$ represents a $C_{1-18}$ alkyl group; and monomer units having the formula $CH_2=CR_5CONHCH_2OH$, wherein $R_5$ represents a hydrogen atom or a methyl group.

U.S. Pat. No. 4,834,764 (Deiner et al.) describes the use of certain blocked isocyanate compounds in combination with reactive perfluoroalkyl containing (co)polymers. Such compounds are said to improve the oil and water repellency and also make possible a reduction in the amount of fluoroalkyl-containing compounds.

World patent publication WO92/17636 (Dams et al.) describes certain compositions comprising a fluorochemical agent, a copolymer extender, and a blocked isocyanate extender.

The present invention provides for a tailored reactive molecule suitable for a chemically bonded thin textile coating that provides water and oil repellency without significantly impacting the feel of the fabric.

In a first aspect, this invention relates to a liquid polyurethane-based composition which comprises a polyfunctional liquid polyurethane-containing adduct wherein the adduct contains as a first functional group at least one structo-terminal blocked isocyanate moiety per molecule, and at least one second structo-terminal functional group per molecule which is a repellent moiety, preferably a perfluoro or siloxane moiety, or a combination thereof.

In a second aspect, this invention relates to a process for preparing a polyfunctional liquid polyurethane-containing composition as mentioned above, by a solvent-free multi-step process which comprises reacting in a first step a polyisocyanate with a polyol to provide an isocyanate-terminated intermediate, in a second step reacting the isocyanate-terminated intermediate with a blocking agent to block at least one isocyanate moiety and in a subsequent step, reacting at least one isocyanate moiety with a repellent compound. In a preferred method for the preparation of the polyfunctional polyurethane:

a) the polyisocyanate comprises at least two isocyanate moieties per molecule with mutually different reactivities to the polyol;

b) the polyol is an organic substance having a molecular weight of from 60 to 20,000 and containing per molecule from two or more isocyanate-reactive functional groups selected from the group consisting of —OH, —SH, —COOH, —NHR where R is hydrogen or alkyl, or epoxy; and c) the repellent compound is a molecule containing one isocyanate-reactive functional group selected from the group consisting of —OH, —SH, —COOH, —NHR where R is hydrogen or alkyl, or epoxy and further containing a second functional group which is not an isocyanate or an isocyanate-reactive moiety, characterized in that:

i) the first step is conducted in essentially anhydrous conditions and in the absence of a urethane-promoting catalyst, the polyol is added at a controlled rate to the polyisocyanate such that the reaction temperature does not exceed 100° C. and the total amount of polyol added is less than a stoichiometric equivalent with respect to the polyisocyanate;

ii) for the second step, the blocking agent is added in a total amount of less than a stoichiometric equivalent with respect to the isocyanate content of the intermediate;

iii) and in one or more subsequent steps, a repellent compound is added such that the final polymer is substantially free of any isocyanate functionality or any isocyanate-reactive functionality.

In another aspect, the invention is to a process for preparation of a polyfunctional polyurethane as above where steps (ii) and (iii) are reversed. Thus in step (ii), a repellent compound is added at less than a stoichiometric equivalent with respect to the isocyanate content of the intermediate and in step (iii), the blocking agent is added.

In yet another aspect, this invention relates to a process for imparting water and oil repellent properties to a textile comprising applying to a surface of a textile an amount of the above disclosed composition sufficient to impart water and/or oil repellent properties thereto. Such treated fibers are preferably heated in a second step at a temperature and for a time sufficient to cure the treated substrate.

This invention also relates to a repellant textile resulting from the treatment of such textile by the above described method.

Treatment of fibers by the composition and method of the present invention is advantageous in that the fiber retains the touch, feeling, color shade and softness originally possessed by the fibers even after treatment and imparts a water and/or oil repellency to such fibers.

A further advantage of the compositions of the present invention for treating textiles is that the urethane compositions have self-emulsifyable behavior and due to the nature of the compounds, their architecture can be tailored to result in smaller r emulsion particles. This imparts the advantage of applying a thinner coating of the above composition versus conventional water repellency compounds.

An additional advantage of the present invention is when the repellent moiety is a perfluoropolyether, such compounds allow self-organization to take place at room temperature so that the textile does not need to undergo a heat treatment after washing.

The polyfunctional polyurethanes of the present invention provide an additional advantage in that when applied to a textile, they are chemically bonded to the textile so that the water and/or oil repellency of such treated textiles is maintained by the textile after repeated washings or extensive use.

When used herein, the term "textile" refers to both textiles which are composed of natural fibers and/or synthetic fibers, for example wool, cotton, silk, nylon, cellulose and also blends of natural fibers and synthetic fibers, including synthetic fibers modified to react with an isocyanate functionality. The treated textile may be in the form of a fiber, a yarn, a woven fabric, a carpet, a knitted fabric, a nonwoven fabric which are formed from the fibers.

The term "repellent moiety" or "repellent compound", or variations thereof, means a moiety or compound which when added to a textile will give the textile the characteristics of repelling water, oil or oil and water. Preferred repellent moieties are perfluorocarbons and siloxanes. Perfluorocarbons are generally characterized in imparting to a textile the ability to repel water and oil and siloxanes are characterized in imparting to a textile the ability to repel water. The ability to repel oils is also associated with stain resistance.

The composition of this invention is characterized in that it comprises a polyfunctional liquid polyurethane adduct bearing a blocked isocyanate functional group and a second different functional group which is a repellent moiety. By the term "liquid" it is meant that the adduct is a liquid at a temperature of 50° C. or less, and preferably is a liquid at a temperature of from 0° C. to 50° C. The composition advantageously comprises the adduct in an amount of from 1 to 99, preferably from 5 to 95, more preferably from 10 to 90, and yet more preferably from 50 to 90 weight percent, based on total parts by weight of the composition.

The polyfunctional liquid polyurethane-containing adduct has a polyol core which is chain extended with an isocyanate moiety and terminated with at least two functional groups. These functional groups are structo-terminal, that is, they are not pendent. At least one chain end bears a blocked isocyanate functional group, and at least one chain end bears a repellent functional group. In a preferred embodiment of this invention, the adduct has on average of from 2 to 8, more preferably from 3 to 8, and yet more preferably from greater than 3 to 6 chain ends per molecule, wherein each chain contains one or more urethane linkages. When the adduct contains from 2 to 8 chain ends per molecule; then from 1 to 7 blocked isocyanate moieties per molecule and from 7 to 1 perfluoro functional moieties are present. The optimum ratio of masked isocyanate moiety to second functional moiety will depend on the intended fabric to be treated and can vary within the ranges of from 1:7 to 7:1, and preferably from 1:2 to 2:1.

The polyfunctional liquid polyurethanes of the present invention can contain additional functional moieties such as an aryl, alkyl, ester, nitrile, alkene, alkyne, halogen, silyl or combinations thereof. The equivalents of repellent moieties, blocking agent and optionally additional functional groups is such that the polyfunctional polyurethane is substantially free of any isocyanate functionality or any isocyante-reactive functionality.

In general, repellent compounds useful in this invention include any of the known agents useful for the treatment of textiles to obtain oil, water or oil and water repellency. Preferred repellent compounds are the known fluoro-containing and siloxane-containing compounds useful for the treating of textiles to obtain water and/or oil repellency.

The fluoro-compounds, called $R_fX$ for brevity, are stable, inert, non-polar, and both oleophobic and hydrophobic. X refers to a isocyanate-reactive functional group where such functional groups include —OH, —SH, —COOH, —NHR, with R being hydrogen or an alkyl moiety, or epoxy. The $R_f$ group preferably contains at least 3 carbon atoms, more preferably 3 to 20 carbon atoms, and most preferably 6 to 14 carbon atoms. $R_f$ can contain straight chain, branched chain, or cyclic aliphatic fluorinated groups, aromatic fluorinated groups or combinations thereof. $R_f$ can optionally contain heteroatoms such as oxygen, divalent or hexavalent sulfur, or nitrogen. It is preferred that $R_f$ contains oxygen. It is preferred that $R_f$ contains 40 percent to 80 percent fluorine by weight, more preferably 50 percent to 78 percent fluorine by weight. The terminal portion of the $R_f$ group is fully fluorinated preferably containing at least 7 fluorine atoms, for example, $CF_3CF_2CF_2$—, $(CF_3)_2CF$—, —$CF_2SF_5$, $F(CF(CF_3)CF_2$—$O)_4CF(CF_3)CH_2$—. Perfluorinated aliphatic groups and perfluorinated ethers are the most preferred embodiments of $R_fX$.

Examples of useful fluorochemical agents include, for example, $R_f$-containing urethanes, ureas, esters, amines (and salts thereof), amides, acids (and salts thereof), carbodiimides, guanidines, allophanates, biurets, oxazolidinones, and other substances containing one or more $R_f$ groups, as well as mixtures and blends thereof. Such agents are well known to those skilled in the art, see for example, Kirk-Othmer, *Encyclopedia of Chemical Technology*, 3rd Ed., Vol. 24, pp. 448–451 and many are commercially available as ready-made formulations. Useful fluorochemical agents can be polymers containing multiple $R_f$ groups such as copolymers of fluorochemical acrylate and/or methacrylate.

Preferred siloxane compounds useful in the present invention can be represented by the general formula

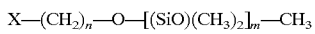

where
 X is as previously defined;
 n is an integer from 1 to 20; and
 m is an integer from 1 to 12.
 Preferably m is an integer from 2 to 15, and more preferably from 3–12. Preferably n is an integer from 1 to 10, and more preferably from 2 to 8. M and n are generally selected such that the molecular weight of the siloxane compound is 120 to 423,000.

Siloxane compound are commercially available, as from ABCR GmbH & Co., Karlsruhe, Germany.

The polyisocyanate used in the process to prepare the adduct product has at least two isocyanate moieties per molecule and which, with respect to the isocyanate-reactive group of the polyol, are distinguished by a difference in reactivity. The reactivity difference optimizes the manufacture of a product having a narrow molecular weight distribution and reduces the potential for formation of higher oligomers leading to gel-like or non-liquid products. When the polyisocyanate contains three or more isocyanate groups per molecule then the relative reactivity of the individual isocyanate moieties is such to minimize formation of higher oligomers. Suitable polyisocyanates can be aliphatic or preferably aromatic polyisocyanates and especially aromatic or aliphatic diisocyanates. An advantage to using diisocyanates, where the relative reactivity of the individual isocyanate groups are different, is that it permits the amounts of free, non-reacted, polyisocyanate that may be present in the isocyanate-terminated intermediate to be limited to the subsequent advantage of material requirements for the second process step, and further to the value of the adduct in end applications. Exemplary of suitable aromatic polyisocyanates include toluene diisocyanate, methylene diphenylisocyanate and polymethylene polyphenylisocyanates. Exemplary of suitable aliphatic polyisocyanates include isophorone diisocyanate, isopropylcyclohexyl diisocyanate and methylene dicyclohexylisocyanate. Preferred are polyisocyanates comprising isomers of toluene diisocyanate, of methylene diphenylisocyanate or mixtures thereof. Especially preferred, for reasons of relative isocyanate reactivity, is 2,4'-methylene diphenylisocyanate and notably 2,4-toluene diisocyanate, or mixtures comprising such diisocyanate.

The term polyol as used herein refers to a compound which has two or more isocyanate-reactive functional groups per molecule where such functional groups include —OH, —SH, —COOH, —NHR, with R being hydrogen or an alkyl moiety, or epoxy. Preferred is a polyol bearing —OH functionality. The polyol may contain up to 8 such functional groups per molecule, preferably from 2 to 8, more preferably from 3 to 8, and most preferably from greater than 3 to 6, functional groups per molecule.

The polyol used in the process of this invention has a molecular weight of from 60 to 20,000; preferably from 200, more preferably from 1000, and yet more preferably from 2000; and preferably up to 15,000, and more preferably up to 10,000. In a preferred embodiment the polyol is a polyester or particularly a polyoxyalkylene polyol where the oxyalkylene entity comprises oxyethylene, oxypropylene, oxybutylene or mixtures of two or more thereof, including especially oxypropylene-oxyethylene mixtures. Alternative polyols that may be used in the invention include polyalkylene carbonate-based polyols and polyphosphate based polyols. The nature of the polyol selected depends on whether or not to impart some water solubility to the adduct, which can be advantageous for certain applications and disadvantageous for other applications. Water solubility can be enhanced by selection of polyols having a lower molecular weight or an elevated oxyethylene content.

Suitable polyoxyalkylene polyols are exemplified by various commercially available polyols as used in polyurethane, lubricant, surfactancy applications and include polyoxypropylene glycols designated as VORANOL™ P-2000 and P-4000 with respectively molecular weights of 2000 and 4000; polyoxypropylene-oxyethylene glycols such as DOWFAX™ DM-30 understood to have a molecular weight of 600 and an oxyethylene content of 65 weight percent, and SYNALOX™ 25D-700 understood to have a molecular weight of 5500 and an oxyethylene content of 65 weight percent, all available from The Dow Chemical Company; polyoxyethylene triols available under the trademark TERRALOX™ and designated as product WG-98 and WG-116 understood to have a molecular weight of 700 and 980, respectively, polyoxypropylene-oxyethylene triols designated as VORANOL™ CP 1000 and CP 3055 understood to have respectively a molecular weight of 1000 and 3000, and VORANOL™ CP 3001 understood to have a molecular weight of 3000 and an oxyethylene content of 10 weight percent and VORANOL™ CP 6001 understood to have a molecular weight of 6000 and an oxyethylene content of 15 weight percent, all available from The Dow Chemical Company; polyoxypropylene hexols including VORANOL™ RN-482 understood to have a molecular weight of 700, and polyoxyethylene hexols including TERRALOX™ HP-400 understood to have a molecular weight of 975, both available from The Dow Chemical Company; higher functionality polyether polyols including those based on carbohydrate initiators such as, for example, sucrose and exemplified by VORANOL™ 370 available from The Dow Chemical Company.

The blocking group is a conventional blocking agent which is removable from the isocyanate under thermal conditions, such as those employed during cure of a fibrous substrate treated with a compound containing the blocked isocyanate group.

Conventional isocyanate blocking agents include alcohols such as 1,6-hexanediol, ethylene glycol, methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol; aryl alcohols (for example, phenols, cresols, nitrophenols, o- and p-chlorophenol, naphthols, 4-hydroxybiphenyl); $C_2$ to $C_8$ alkanone oximes (for example, acetone oxime, butanone oxime); benzophenone oxime; aryl-thiols (for example, thiophenol); organic carbanion active hydrogen compounds (for example, diethyl malonate, acetylacetone, ethyl acetoacetate, ethyl cyanoacetate); epsilon-caprolactam; a primary or secondary amine (for example, butyl amine); hydroxylamine; and primary amino mercaptan and secondary amino mercaptans. Particularly preferred blocked isocyanates include those blocked with $C_2$ to $C_8$ alkanone oximes, for example, 2-butanone oxime, with a phenol, with a lactam, with 2-ethylhexanol, or with glycidol.

In a preferred embodiment of this invention the polyisocyanate is toluene diisocyanate comprising, substantially, the 2,4-isomer; the polyol is a polyoxyalkylene polyol, especially a polyoxyethylene-oxypropylene polyol containing from 3 to 6 hydroxyl groups; the blocking agent is 2-butanone oxime and the preferred fluorocarbons are $CF_3CF_2CF_2$—, $(CF_3)_2CF$—, —$CF_2SF_5$, and $F(CF(CF_3)CF_2$—$O)_4CF(CF_3)CH_2$—.

The method of preparing the polyurethane compositions of the present invention comprises a multi-step process.

The first step concerns the preparation of an isocyanate-terminated intermediate by reacting the polyisocyanate with the polyol at a reaction temperature that does not exceed 100° C., in essentially anhydrous conditions. By "essentially anhydrous conditions" it is meant that water is present in an amount of less than 1500, preferably less than 750, more preferably less than 350 ppm of total polyisocyanate and polyol reactants. The presence of water in an amount greater than this increases the risk of forming gel or solid products. The reaction temperature advantageously is from 20° C., more preferably from 35° C.; and preferably up to 80° C., more preferably up to 70° C. At higher reaction temperatures, the beneficial effect of the relative isocyanate reactivity rates can be substantially diminished, and additionally isocyanate may be consumed by an undesirable allophanate reaction. The polyol is added at a controlled rate to the polyisocyanate such that the reaction temperature does not exceed 100° C., and the total amount of polyol added is a stoichiometric equivalent or less with respect to the polyisocyanate. The total amount of polyol advantageously does not exceed 0.99, preferably does not exceed 0.95 of an equivalent; and advantageously is at least 0.1, preferably at least 0.25, and more preferably from 0.5 of an equivalent per equivalent of isocyanate.

The first process step is conducted in the absence of a processing aid. By the term "processing aid" in the context of this invention, it is meant substances that promote the formation of urethane linkage by reaction of isocyanate with an active hydrogen atom. To minimize potential gel formation, solidification, it is advantageous to use polyols that do not contain any catalyst or catalyst finishing residues, for example, potassium acetate, which might promote urethane formation or isocyanate dimerization or trimerization. Additionally to minimize gel formation when preparing the intermediate it is advantageous to use polyols, especially polyols, that have an acid content.

The intermediate can be characterized in that it has an isocyanate content of from about 0.5 to about 5, preferably from about 1 to about 4 weight percent and is a composition which comprises structures (I), (II), and (III) represented by the structural formulae:

$$P(\text{-}A)_b \quad (I)$$

$$A \text{ or } A\text{-} \quad (II)$$

$$A\text{-}(P\text{-}A)_c\text{-}P\text{-}A \quad (III)$$

wherein:

$c \geq 1$

A- is a residue from a polyisocyanate;

A is a free polyisocyanate

P is a residue from a polyol; and b is the number of isocyanate reactive groups formally present on the polyol.

The proportions and amounts of (I), (II), and (III) based on total mole amount of said substances, in an amount of from: for (I), at least 65, preferably at least 75, more preferably at least 80, and up to 100 mole percent; for (II), less than 35, preferably less than 25, more preferably less than 15, and most preferably 0 mole percent; and for (III), less than 12, preferably less than about 10, more preferably less than about 7, yet more preferably less than 5, and most preferably 0 mole percent. In a preferred embodiment the adduct composition may comprises substances (I), (II), and (III) in the mole percent ranges of from 65 to 90: from 30 to 5: from about 6 to 1 respectively, wherein the total is to 100. By reference to purity, it is understood that the end product has a low content of free polyisocyanates and adducts represented by structures (II) and (III), respectively.

The proportion and amounts of (I), (II) and (III) are carried over in the formation of adducts of the present invention. By way of example, when all the isocyanate moieties of the intermediate contain a blocking group or repellent group, the final adduct can be represented by the general structure (IV)

$$(W\text{-}A)_{(b\text{-}d)}\text{-}P\text{-}(A\text{-}M)_d \quad (IV)$$

where

P, A and b are as previously defined;

M represents a blocking moiety;

W represents a repellent moiety; and d is the number of blocked isocyanate groups.

As per the description herein, b is greater than d.

The process minimizes the formation of structure (III) type substances, resulting in an adduct which has a liquid characteristic at room temperature, especially when the polyol used in the preparation of the adduct formally contained three or more isocyanate reactive groups/molecule. Adduct III is depicted with a linear structure although it can have a highly complex branched structure.

When the resulting isocyanate-terminated intermediate has a high free, unreacted, isocyanate content, and before proceeding with the second step of the process it can be advantageous to reduce such content by, for example, distillation or extraction techniques using suitable solvents including pentane or hexane. Free, unreacted isocyanate can participate in the second process step providing capped products, the presence of which in the final product may be detrimental to performance in certain end applications.

In the second step of the process, the isocyanate-terminated intermediate is reacted with less than a stoichiometric amount of a blocking agent. The stoichiometry is such to provide for the desired content of capped isocyanate moieties.

The process for blocking isocyanates can be carried out under conditions which are well know in the art. See for example, U.S. Pat. Nos., 4,008,247; 4,189,601; 4,190,582; 4,191,843; and 4,191,833, the disclosures of which are incorporated herein by reference, and Z. W. Wicks, Progress in Organic Coatings, volume 3, pages 73–99 (1975) and volume 9, pages 3–28 (1981). The process temperature is chosen for convenience of reaction time and can be greater than 80° C. without noticeable detriment to the quality of the resulting product. Exposure to a temperature greater than 100° C. should be minimized to avoid undesirable side reactions, such as reversal of the blocking reaction.

In a third or subsequent step of the process, the partially blocked isocyanate-terminated intermediate is reacted with a repellent compound. When the repellent compound is the final functional moiety to be added to a partially blocked isocyanate-terminated intermediate, the repellent compound is added in an amount sufficient to "cap" the remaining reactive isocyanate groups to provide for the final adduct.

For addition of a functional group to the blocked isocyanate-terminated intermediate, such as a repellent compound, the process temperature is chosen for convenience of reaction time and can be greater than 80° C. In general, exposure to a temperature greater than 100° C. should be minimized for the purpose of avoiding undesirable side reactions. The reaction of the blocked isocyanate-terminated intermediate with a polyfunctional substance can, if desired, be accelerated by use of a suitable urethane-promoting catalyst. Representative of such catalysts include tertiary amine compounds and organotin compounds as used when preparing, for example, polyurethane foam by reaction of a polyisocyanate with a polyol. It is to be noted that use of a catalyst in this step can lead to final adducts having a higher viscosity than those prepared in the absence of catalyst.

A third or subsequent step means at least one step in which a repellent compound is reacted with a partially blocked isocyanate-terminated intermediate. Thus the third step encompasses a process where one repellent compound, such as a fluorocarbon, is added in less than a stoichiometric amount with respect to the reactive isocyanate groups, and in a subsequent step another functional moiety is added. Thus the process encompasses the addition of multiple repellent molecules or other functional moieties.

The polyurethane compositions of the present invention can also be produced whereby the final step in the process is the addition of a blocking agent. Thus the isocyanate-terminated intermediate produced in the first step is reacted with one or more repellent compounds, and optionally with other functional moieties, in less than a stoichiometric amount with respect to the reactive isocyanate groups. In the final step sufficient blocking agent is then added to provide a polyfunctional polymer which contains substantially no free isocyanate functionality.

The polyfunctional polyurethanes of the present invention can be applied to the textile by common processes known to those skilled in the art. The polyfunctional polyurethane is generally applied using a solvent. Preferred solvents are ketones, ethers and esters or mixtures thereof. Alternatively, a composition can be prepared in the form of an aqueous dispersion or emulsion and the textile treated therewith. The polyfunctional polyurethanes of the present invention are particular advantageous when containing a perfluoroether in that these are capable of forming an emulsion in water. When water is used as a solvent, water is preferably present is an amount of 70 to 900 parts by weight based on 100 parts of weight of the composition of the invention.

A composition of the invention comprises the polyfunctional polyurethane, containing the repellent-functionality, in an amount sufficient to impart repellent properties to a fibrous substrate treated with the composition. The amount of the polyfunctional polyurethane that constitutes an effective amount can be easily determined to those skilled in the art and depends on the particular fluorocarbon agent used and textile to be treated.

When the composition of the invention is applied as a treatment to a fibrous substrate, such as a fabric intended for use in a garment, it is preferred that the treated substrate comprise the polyfunctional polyurethane in a amount of 0.01 percent to 5 percent by weight based on the weight of the untreated fiber. More preferred is an amount of 0.01 percent to 3 percent by weight of the untreated fiber.

Once the polyfunctional polyurethane has been applied to a textile, the textile is cured at a temperature and for a time sufficient to provide a cured treated substrate. This curing process can be carried out at temperatures between 110° C. and 190° C. depending on the particular composition used. In general, a temperature of 150° C. for a period of 1 to 10 minutes, preferably 3 to 5 minutes, is suitable. The curing process breaks the bond between an isocyanate functional group and the blocking agent and allows the isocyanate to react and form a chemical bond with the treated textile. The cured treated substrate can be cooled to room temperature and used as desired, for example, incorporated or fashioned into a garment such as rainwear.

The need for a blocking agent on an isocyante moiety is to prevent the moiety from reacting with water if the composition is to be applied to a fiber in a solvent containing water. In another aspect of the invention, if it is desired to apply a polyurethane composition containing a repellent moiety without the use of a water solvent, the process step of adding a blocking agent to an isocyanate moiety can be omitted. This will then result in a polyfunctional liquid polyurethane-containing adduct wherein the adduct contains as a first functional group at least isocyanate moiety per molecule, and at least one second functional group per molecule which is a repellent moiety. Such compositions can then be applied to the fibers directly without the need of an aqueous solvent.

The invention is illustrated by the following examples in which all parts and percentages are by weight, unless otherwise stated.

EXAMPLE 1

To a flask fitted with a mechanical stirrer was added 348.32 g of toluene diisocyanate (TDI) (2.0 mol) and the TDI heated up to 50° C. under a nitrogen atmosphere. To this was slowly added, under vigorous stirring, 500 g of a hexol (0.0833 mol). The final TDI/OH ratio was 4/1. No catalyst was used during the formation of the prepolymer. Total addition time was 12 hours. After the addition the reaction mixture was left stirring overnight at 50 deg C. The reaction mixtures was then passed through a distillation unit to remove excess TDI.

To the above obtained product 14.52 g (0.167 mol) of 2-butanone oxime was quickly added under vigorous stirring. This was followed by the addition of 0.47 grams (0.05 weight percent based on the total weight of the reaction mixture) dibutyltin dilaurate. Next 121.36 g (0.333 mol) 1H,1H,2H,2H-perfluorooctan-1-ol was added. The reaction mixture was left stirring for two hours at 50° C. to complete the reaction. Via this process, on average, four of the six end groups (isocyanate moiety) are capped with a perfluoro group, and the remaining two end groups are capped with 2-butanon oxime (blocked isocyanate groups).

To test the oil and water repellency, contact angle experiments have been performed on regenerated cellulose foil (Rayophane 600 p), coated by the polyfunctional polyurethane.

Rayophane 600 p (from UCB Films), which was chemically identical to cotton fiber, was coated by spin casting (10 sec, 3000 rpm) of a 5 wt percent solution in tetrahydrofuran (THF) to obtain a thin and uniform layer of the above product. Prior to contact angle measurement, the cellulose foil was annealed for 30 min at 150° C. in vacuum. The contact angle was measured by the sessile drop method. This method was based on measuring directly the contact angle of a liquid drop sitting on a flat surface. Water and hexadecane were chosen for contact angle testing. Water was chosen to measure the water repellency and hexadecane to measure the oil repellency (since it has a surface tension similar to oil).

With water, a contact angle of 111.6 deg was measured and with hexadecane a contact angle of 74.81 deg was measured, equaling fluorocarbon surfaces in general.

Also the Water-Repellency Spray Test (AATCC test method 22-1989) and the Oil Repellency Test (AATCC test method 118-1992) showed the water and oil repellent properties with values of 100 (water repellency) and 5 (oil repellency).

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A polyfunctional liquid polyurethane-containing adduct wherein the adduct contains as a first functional group at least one structo-terminal blocked isocyanate moiety per molecule and as a second structo-terminal functional group at least one siloxane moiety.

2. A liquid polyurethane-based composition wherein the composition comprises 1 to 99 percent by weight of the adduct of claim 1.

3. The composition of claim 2 wherein the composition comprises 5 to 95 percent by weight of the adduct of claim 1.

4. The composition of claim 3 wherein the composition comprises 10 to 90 percent by weight of the adduct of claim 1.

5. The composition of claim 2 wherein the adduct has 3 to 8 structo-terminal ends per molecule and 2 to 7 of such strutco-terminal ends comprise a siloxane moiety.

6. A method for imparting water or oil repellent properties to a fibrous substrate, comprising applying to the surface of the fibrous substrate an adduct of claim 1.

7. The method of claim 6 wherein after application of the adduct to the fibrous substrate, the fibrous substrate is heated at a temperature and for a time sufficient to cure the treated substrate.

8. The method of claim 6 wherein the adduct is present on the fiber substrate in an amount of 0.01 percent to 5 percent by weight based on the weight of the untreated substrate material.

9. A textile which is treated with the method according to claim 6.

\* \* \* \* \*